(12) United States Patent　　　(10) Patent No.:　　US 6,553,977 B2
Schmitz　　　　　　　　　　　　　(45) Date of Patent:　　Apr. 29, 2003

(54) FIVE-STROKE INTERNAL COMBUSTION ENGINE

(76) Inventor: Gerhard Schmitz, Am Sonnenhang 26, B-4780 Sant-Vith (BE)

( * ) Notice: Subject to any disclaimer, the term of this patent is extended or adjusted under 35 U.S.C. 154(b) by 0 days.

(21) Appl. No.: 10/001,382

(22) Filed: Oct. 26, 2001

(65) Prior Publication Data

US 2002/0050253 A1 May 2, 2002

(30) Foreign Application Priority Data

Oct. 26, 2000　(BE) ........................................ 2000/0684

(51) Int. Cl.[7] .............................................. F02B 33/00
(52) U.S. Cl. ..................... 123/561; 123/70 R; 60/620
(58) Field of Search .............................. 123/70 R, 560, 123/561; 60/605.2, 620, 605.1

(56) References Cited

U.S. PATENT DOCUMENTS 4,917,054 A * 4/1990 Schmitz ................. 123/59 EC
5,072,589 A * 12/1991 Schmitz ...................... 60/622
5,265,564 A * 11/1993 Dullaway ................. 123/70 R
5,950,432 A *  9/1999 Zimmer et al. ............ 60/605.1
6,318,310 B1 * 11/2001 Clarke ..................... 123/70 R

* cited by examiner

*Primary Examiner*—Hoang Nguyen
(74) *Attorney, Agent, or Firm*—Steinberg & Raskin, P.C.

(57) ABSTRACT

The present invention concerns a process of construction of a five-stroke internal combustion engine comprising especially at least one low-pressure cylinder (1) functioning in a two-stroke mode located between two high-pressure combustion cylinder (2,3) functioning in a four-stroke mode, the work chamber (C2, C3) of each combustion cylinder (2,3) being capable of communicating with the work chamber (C1) of the low-pressure cylinder (1) via a decanting valve (9) associated with the combustion cylinders (2,3) and a decanting manifold (16,17), and comprising a means of excess feeding the combustion cylinders (2,3), this process being characterized by the fact that the volume compression ratio of the combustion cylinders is relatively low, so as to be able to be highly supercharged.

The invention can be used in the field of gasoline engine or Diesel engine.

10 Claims, 12 Drawing Sheets

FIVE-STROKE INTERNAL COMBUSTION ENGINE

The present invention concerns a process of construction of an internal combustion engine of a type containing at least one cylinder, comprising a work chamber of a volume which is able to vary by the travel of a piston in the cylinder between a high dead centre position and a low centre position under the action of forces of pressure, periodically generated in the said chamber, with each cylinder associated with a means of intake and evacuation of a gaseous fluid, the piston of each cylinder being connected to a crankshaft of the engine.

It also concerns an engine for the implementation of this process.

The majority of current engines work in a four-stroke thermodynamic cycle. At a first stroke called intake or suction, the piston retreats or descends in the cylinder which is filled with an air-fuel mixture (a classical petrol engine, that is to say, with ignition controlled according to the Otto cycle) During a second stroke, the piston rising in the cylinder compresses the said mixture and the fuel evaporates due to the rise in temperature in the cylinder. When the piston approaches its high dead centre, a spark is generated which detonates at the points of a sparking plug, ignites the gaseous mixture, bringing about combustion and an abrupt rise in temperature and pressure in the cylinder.

During a third stroke, in re-descending or retreating in the cylinder, the piston allows the gases of combustion to expand and it is at that moment that useful work is produced. When the piston approaches its low dead centre, the gases, which are still under a certain amount of pressure, escape through an exhaust valve located in the cylinder head. During a fourth stroke, the piston again rises and the said exhaust of the burnt gases is thus completed.

The distance traversed by the piston during the four strokes of this cycle is the same on each occasion, especially that which is traversed during the process of compression of the piston (second stroke) and that traversed during the process of expansion (third stroke). Thermodynamic considerations show that the higher the ratio of expansion, the greater the output of energy, that is to say, the higher is the ratio of useful work to the heat supply of the fuel. In a case where these two ratios, that of compression and that of expansion, are no longer joined and forced to be equal, the same considerations show that for a given fixed expansion ratio, the said energy output increases with a falling rate of compression.

Moreover, in order to reduce the weight and dimensions of internal combustion engines, as well as the friction generated inside the same, it is desirable to increase the power density of such engines. The said increase of the power density is obtained, in particular, by increasing the air intake into the cylinder by the same volume, by allowing an intake of pre-compressed air into the engine. In the case of a petrol engine, this pre-compression must be accompanied by a reduction in the rate of compression of the engine, in order to avoid the phenomenon of spark ping, that is to say, the spontaneous partial detonation of the air-fuel mixture, which, should it occur, would destroy the walls of the cylinder combustion chamber. The increase in power density of a classical four-stroke petrol engine must therefore be accompanied by a reduction in the rate of compression and consequently also in the rate of expansion, taking into account the mandatory equality of the two rates, which will ultimately decrease the output of energy.

In the case of an internal combustion engine which is able to withstand a high supercharge, the adjustment of the load or of the power of the engine shall largely be effected by the adjustment of the delivery pressure of the compressor in question and no longer, as in the case of a classical four-stroke spark ignition engine, by a throttle valve at the intake. The consequence of this is that the adjustment of the load of this engine by means of the delivery pressure of the compressor, makes it possible to avoid losses called "by pumping", which are met in the adjustment of the classical load via a throttle valve. In fact, throttling the natural suction generates a pressure in the cylinder during the intake stroke of the piston, a pressure which is lower than the environmental pressure. On the other hand, the counter-pressure during the exhaust stroke of the piston, even with a partial load, will always be in the neighbourhood of the environmental pressure, which will lead to a negative balance of mechanical work of the crankshaft throughout the intake and exhaust cycles.

The present invention has the principal object of increasing the energy output as well as the power density of an internal combustion engine, by the implementation of an electrodynamic cycle within a piston machine, which makes possible the decoupling of the compression ratio and the expansion ratio. The interest is in optimising, on the one hand, the expansion of the gases of combustion in such a way as to optimise the energy output and on the other hand, to reduce the compression ratio, in order to make possible a high supercharge of the engine in question, in order to increase its power density.

This object is achieved by the insertion of additional time into the four-stroke cycle of the engine, which will be the second expansion of the gases of combustion by means of an additional cylinder. The said cylinder will function, looked on separately, according to a two-stroke cycle that is to say that the piston of this cylinder, in retreating or descending in the cylinder, will on each occasion expand the gases of combustion for a second time (fourth stroke) and then, advancing in the said cylinder, it will evacuate these gases (fifth stroke). The five-stroke cycle of the engine according to the present invention will consist in the intake of air or an air-fuel mixture, its compression followed by combustion, the first expansion of the gases of combustion, their second expansion and finally the exhaust of the gases of combustion. The intake, the compression and the first expansion will take place in the same small cylinder called a high-pressure combustion cylinder. The compression ratio, as well as the first expansion ratio, will consequently be equal. The second expansion will be effected by two cylinders during the decantation of the gases of combustion from the small combustion cylinder, the piston of the latter travelling to its high dead centre, to the large low-pressure cylinder, the piston of the low-pressure cylinder travelling to its low dead centre. The overall expansion ratio will be the product of the volume ratio of the first expansion and the volume ratio of the second expansion. This overall expansion ratio will, in fact, be equal to the ratio of the low pressure piston swept volume, the low-pressure cylinder being in the low dead centre position, divided by the volume of the combustion chamber of the high-pressure combustion cylinder, the latter's piston being in the high dead centre position.

Thus, the invention provides a process of construction of an internal combustion engine of a type comprising at least one cylinder, which includes a work chamber of a volume which can vary through the travel in the cylinder of a piston between a high dead centre position and a low dead centre position, under the action of pressure forces periodically generated in the said chamber, a means of intake and evacuation of a gaseous fluid being associated with each cylinder, the piston of each cylinder being connected to an engine crankshaft and which uses at least, on the one hand, a cylinder which functions as a low-pressure cylinder according to a two-stroke mode which comprises intake accompanied by expansion, generating useful work during each stroke of the piston of the low-pressure cylinder to its low dead centre and the exhaust of a gaseous fluid during each stroke of the said piston towards its high dead centre and on the other hand, two cylinders functioning as combustion cylinders in the four-stroke mode, comprising the intake of air or of an air-fuel mixture during the first stroke of the piston of each of the combustion cylinders to its low dead centre, the compression of this air or air-fuel mixture during the first stroke of the piston to its high dead centre, followed by combustion, the expansion of the gases of combustion during the second stroke of the piston to its low dead centre generating useful work and the delivery of the gases of combustion during the second stroke of the piston to its high dead centre, the piston swept volume of each of the combustion cylinders being lower than that of the low-pressure cylinder and the combustion cylinders delivering their gases of combustion in alternation to the low-pressure cylinder, with a view to a second expansion of the gases of combustion and their exhaust from the engine and comprising a means of excess feeding the combustion cylinders, the process being characterised by the fact that the volume compression ratio of the combustion cylinders is relatively low, so as to be able to be highly supercharged.

The invention also provides an internal combustion engine for implementing the aforementioned process, the internal combustion engine comprising five cylinders arranged in line, including three high-pressure combustion cylinders and two low-pressure cylinders, two combustion cylinders being located at the ends of the crankshaft to which are connected the pistons of the two cylinders, the third high-pressure combustion cylinder being located in the centre and able to communicate with the two adjacent low-pressure cylinders, respectively by means of a valve and a decanting manifold in such a way, as simultaneously to transfer, during the second expansion cycle, the gases of combustion contained in the central combustion cylinder and in the two low-pressure cylinders which are associated therewith, the said low-pressure cylinders receiving, during a revolution of the crankshaft occurring during the travel of the piston to its low dead centre, all the gases of combustion contained in the combustion cylinder located at the end of the crankshaft and next to the low-pressure cylinder in question.

According to yet another embodiment of the invention, the internal combustion engine comprises an odd number, greater than five, of cylinders arranged in line in such a way that at the ends of its crankshaft are located two high-pressure combustion cylinders and in such a way that the other high-pressure combustion cylinders are located between two low-pressure cylinders and are able to communicate with the two adjacent low-pressure cylinders, respectively by means of a valve and a decanting manifold, so as simultaneously to transfer, during the second expansion cycle, the gases of combustion contained in the combustion cylinder, to the two low-pressure cylinders which are associated therewith.

The engine moreover comprises a means of controlling the supercharge pressure of air or of the air-fuel mixture of the combustion cylinders, in order to effect an adjustment of the engine load for a given speed, largely of the range of the functioning torque thereof and a compressor driven mechanically or a turbo-compressor unit, whose turbine is driven by the additional expansion of the engine exhaust gases, in order to provide the pre-compression of air or the air-fuel mixture, cooled if necessary by means of a heat exchanger, the inlet of the turbine being connected to a collector of the gases of combustion, fitted with a valve of the waste gate type which makes it possible, when it is open or partially open, to divert all or a part of the gases of combustion directly to the engine exhaust.

The intake manifolds of the combustion cylinders comprise a means of introduction of the fuel into the pre-compressed fluid, such that the controlled means of injection or carburettors and the work chambers of the combustion cylinders, are each of them equipped with a means of igniting the air-fuel mixture.

The work chambers of the combustion cylinders comprise, according to the variant of the embodiment, a means of direct injection of the fuel into the compressed air to the end of the compression cycle in the cylinders in such a way that the fuel ignites spontaneously.

In a variant, the work chambers of the combustion cylinders comprise a means of direct injection of the fuel into the compressed air during the compression stroke in respect of the variable ratios of weight of air to the weight of fuel and which are controlled according to the engine load, the work chambers of the high-pressure combustion cylinders being equipped with a means making it possible to ignite the air-fuel mixture.

According to another variant, the low-pressure cylinder comprises exhaust ports fitted inside the former, which wholly or partially evacuate the gases of combustion contained in the cylinder and which are uncovered by the piston of the cylinder, when the latter is in a position close to its low dead centre.

In a case where the engine comprises of turbo-compressor unit which makes possible the pre-compression of the air or the air-fuel mixture at the intake of the combustion cylinders, there are provided, according to another variant, up to three different exhaust channels or exhaust manifolds which are fed in a non-simultaneous manner and which make it possible during the stroke of the low-pressure cylinder piston towards its high dead centre, to deliver the gases of combustion contained in the cylinder, in the direction of the inlet of the turbine, all the said exhaust manifolds except the last one comprising a deflection flap of the gases of combustion, controlled individually according to the engine load and which, when in an open position, leads the gases of combustion from the low-pressure cylinder directly to the exhaust and which, when closed, guides the gases of combustion into the collector of gases of combustion connected to the inlet of the turbine, the last exhaust manifold being the first in communication with the work chamber of the low-pressure cylinder.

Advantageously, each of the aforementioned decanting manifolds comprises an auxiliary decanting valve associated with the low-pressure cylinder head and which opens approximately synchronously with the principal decanting valve of the same decanting manifold being associated with the head of the combustion cylinder.

The invention will be better understood and other objects, characteristics, details and advantages of the said invention will become clearer from the description of an application which will follow and which will refer to the diagrams which are appended and which are only illustrative of several embodiments of the invention, where FIG. 1 shows the vertical section of the engine block of a first embodiment of an internal combustion engine with 3 cylinders according to the invention;

Figure 5:
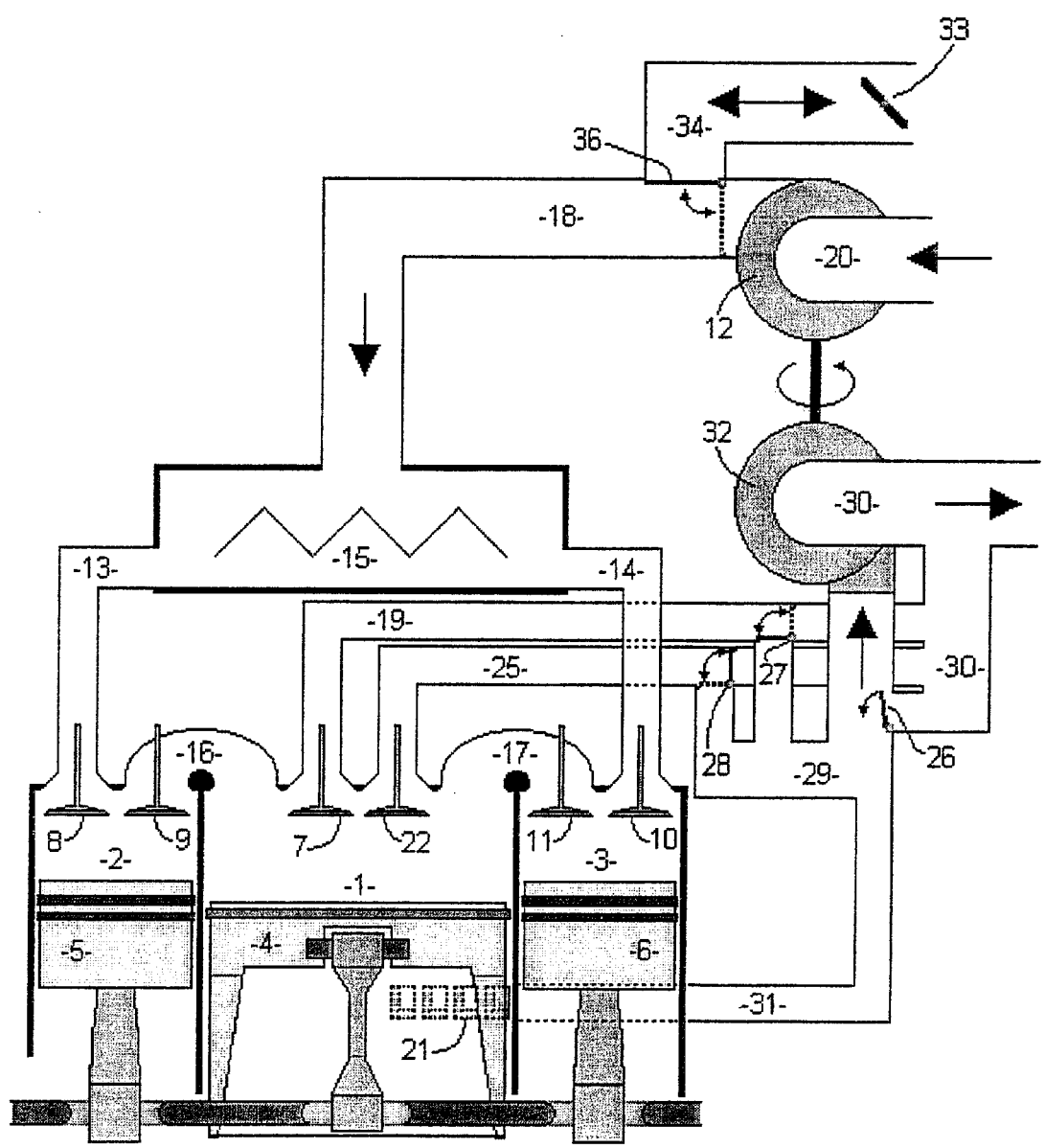
FIG. 5 shows the engine with three cylinders from FIG. 1, supercharged by a turbo-compressor unit whose turbine is fed by the exhaust gasses sent through three different channels.
Figure 6:
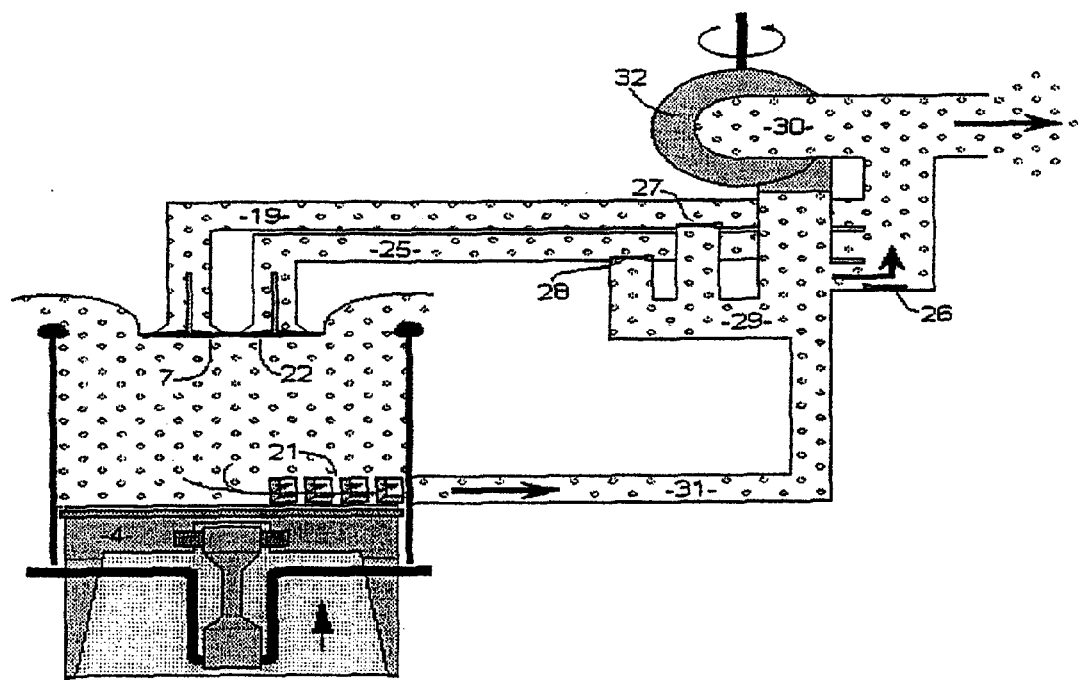
FIGS. 6a and 6b show the engine from FIG. 5 functioning at a very low load, without being supercharged and the piston of whose low-pressure cylinder occupies three positions during the exhaust stroke.
Figure 6:
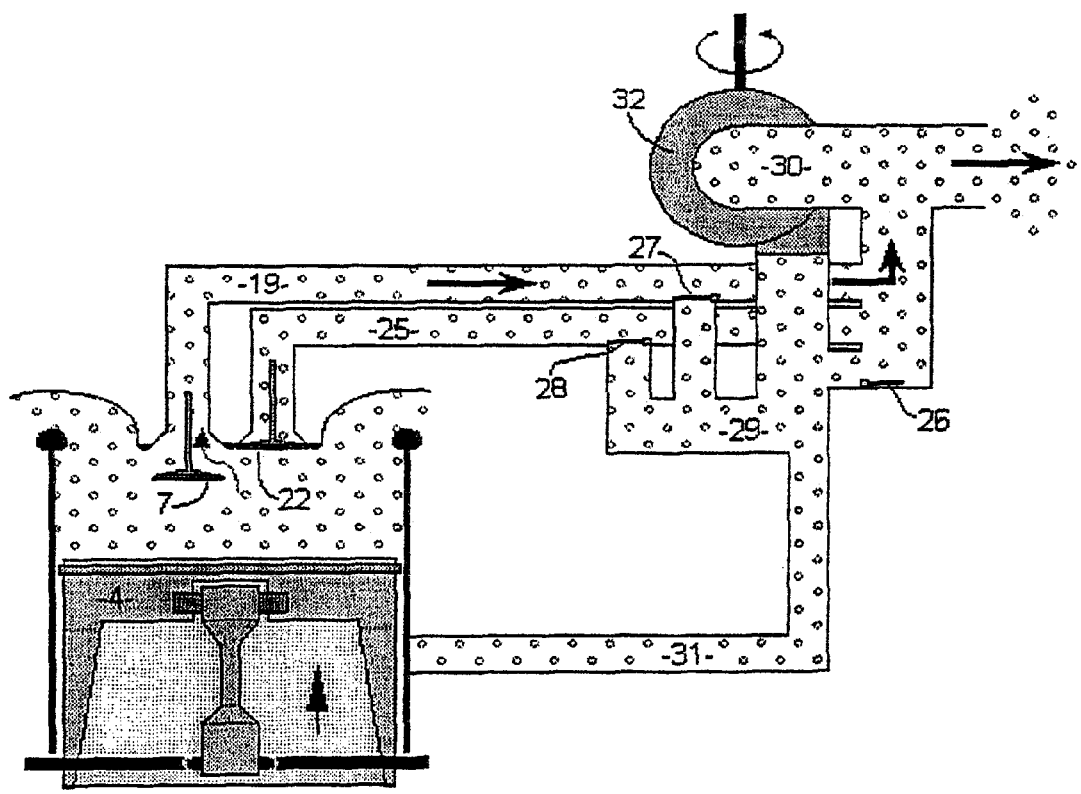
Figure 6:
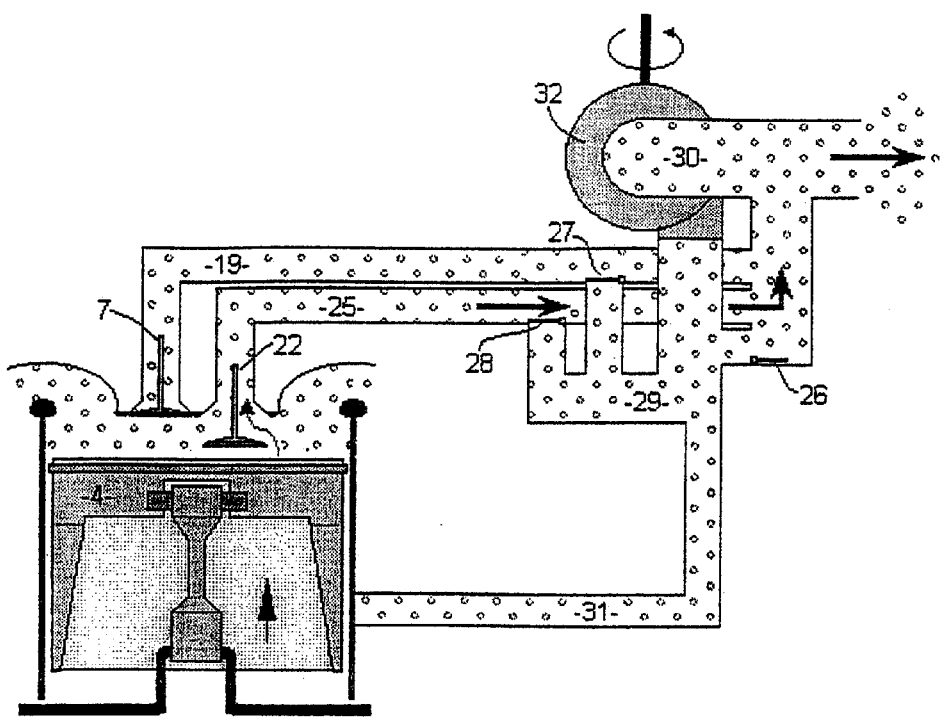
Figure 7:
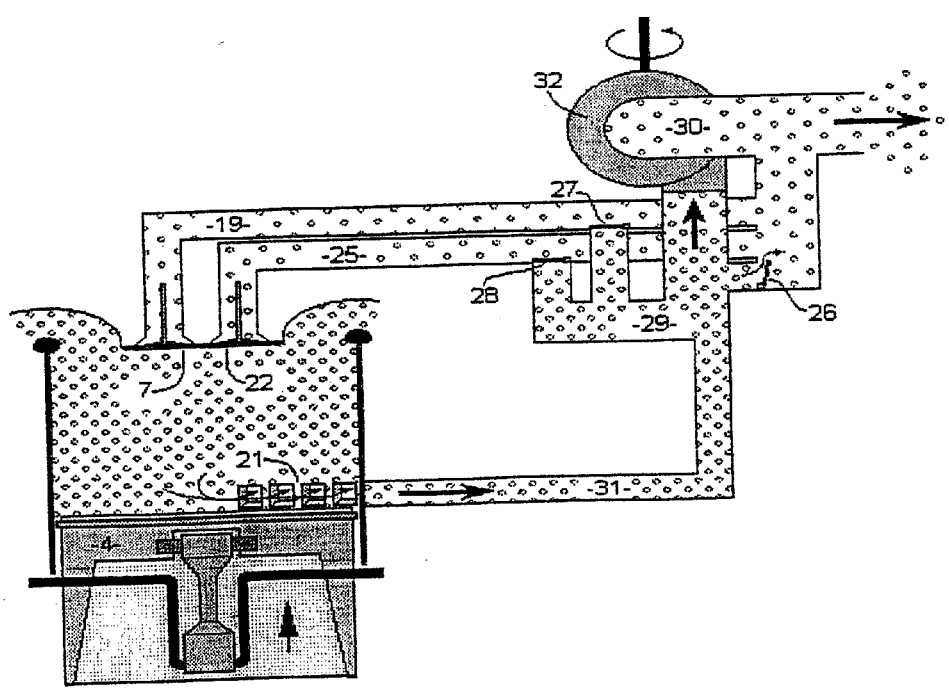
FIGS. 7a to 7c show the engine from FIG. 5, functioning at a low load and being slightly supercharged and the piston of whose low pressure cylinder occupies three positions during the exhaust stroke.
Figure 7:
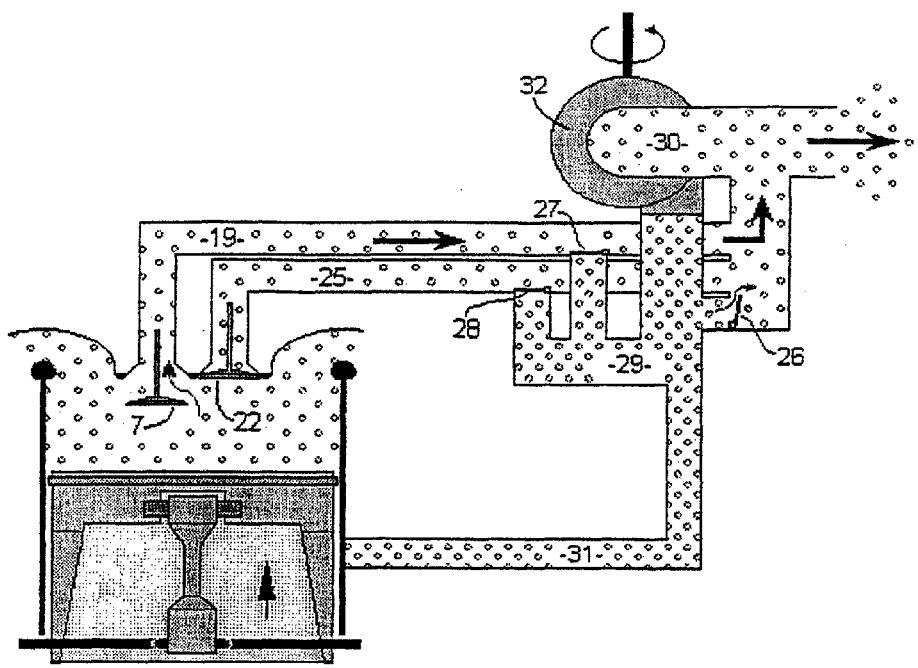
Figure 7:
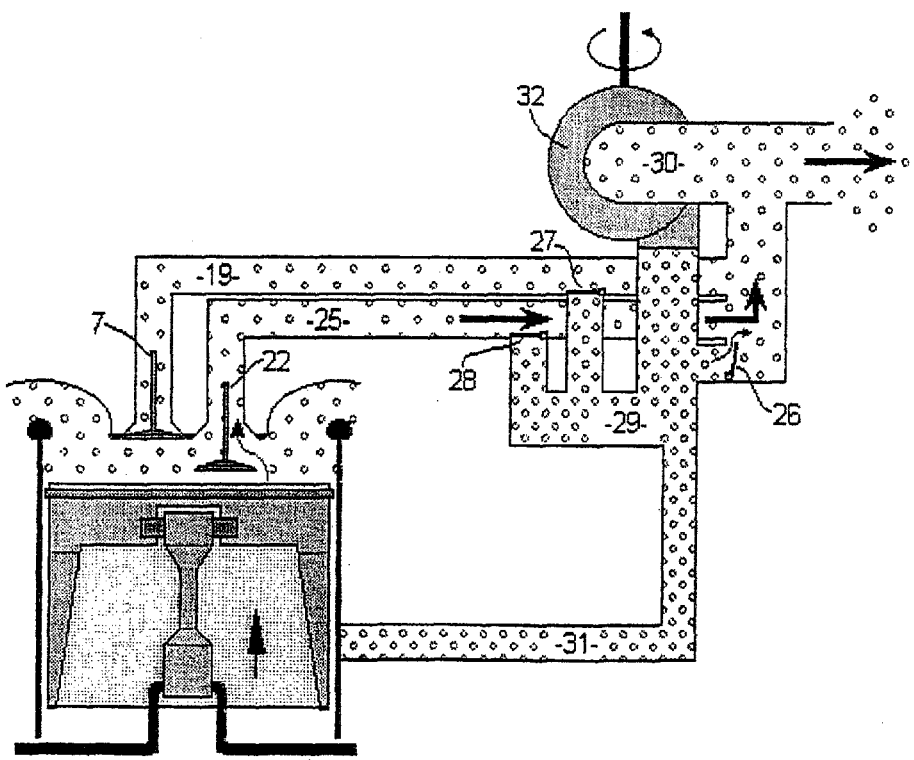
Figure 8:
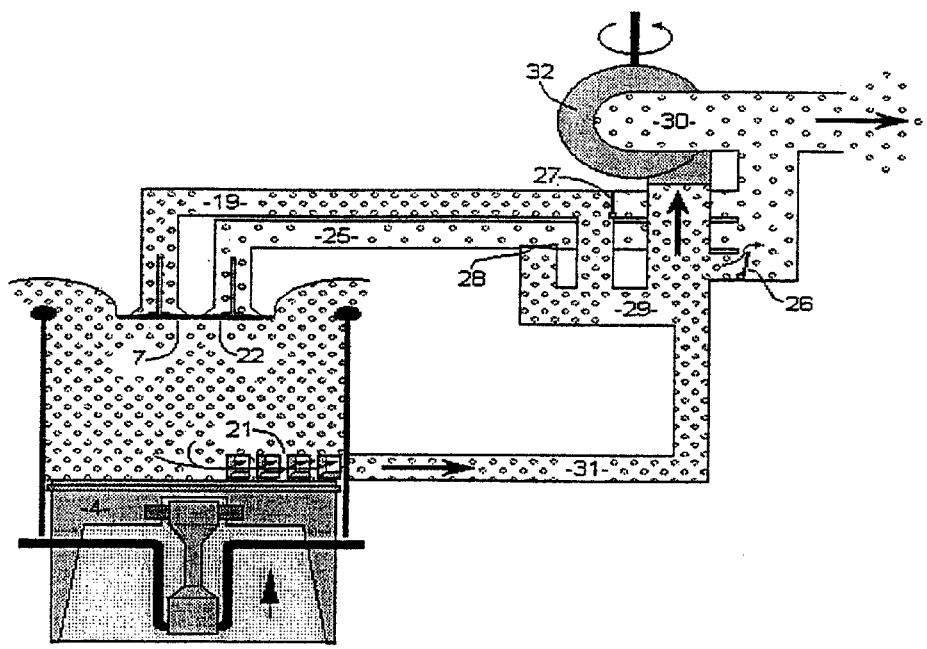
Figure 8:
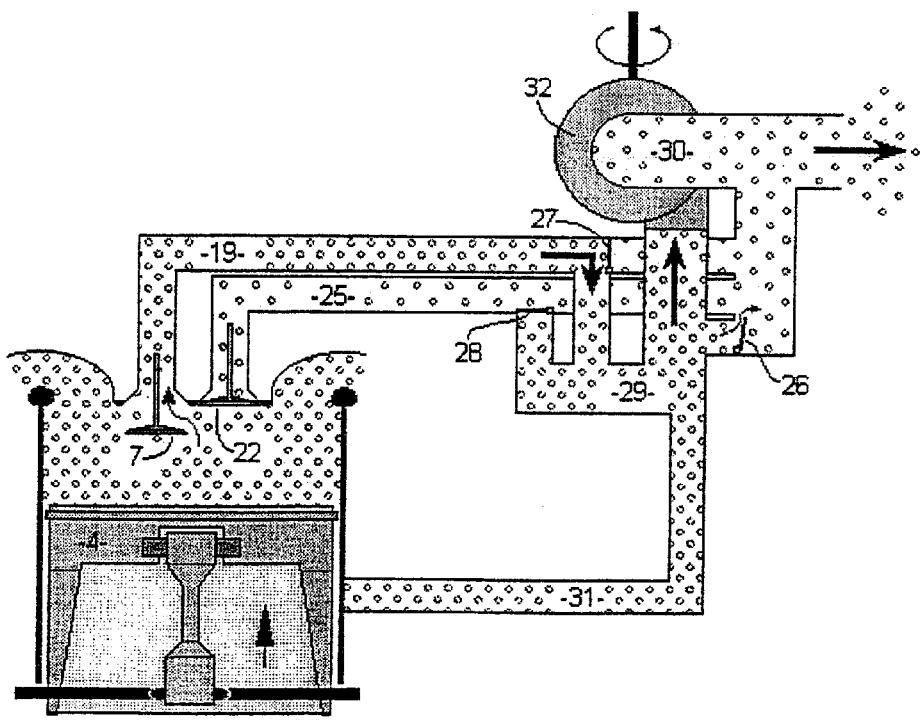
Figure 8:
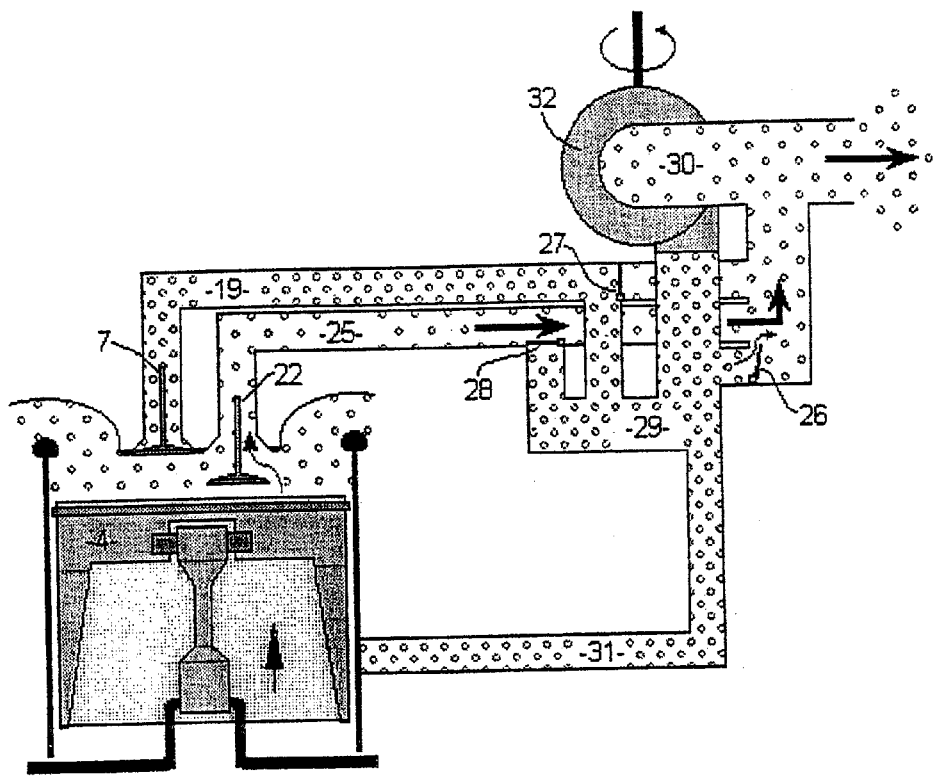
Figure 9:
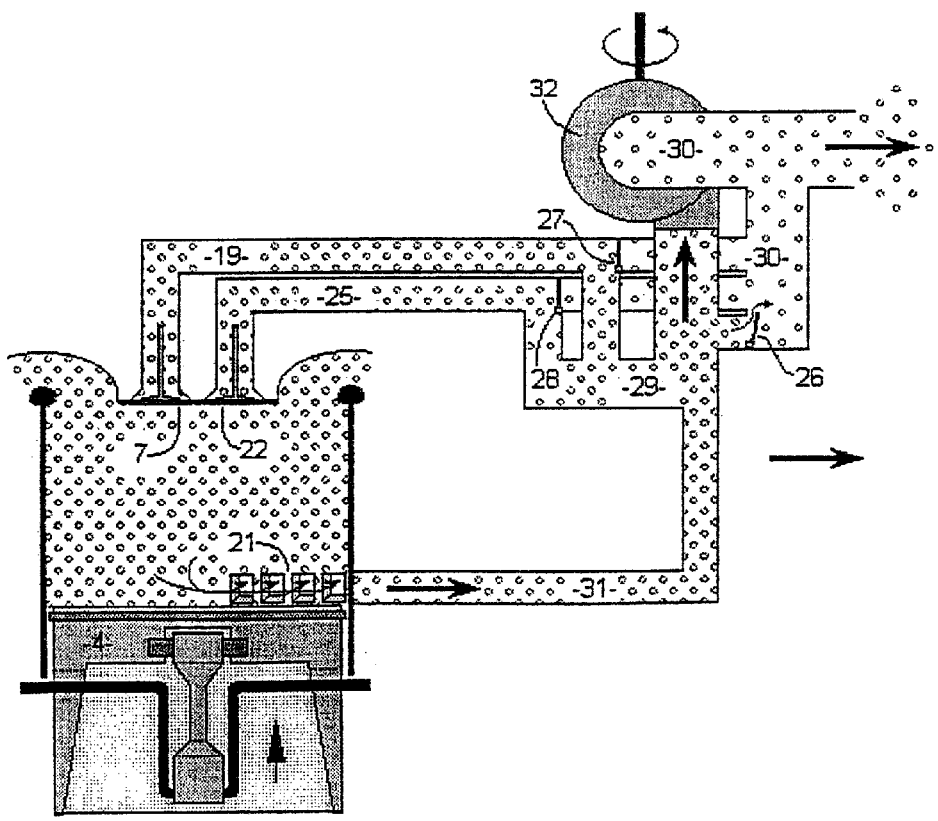
Figure 9:
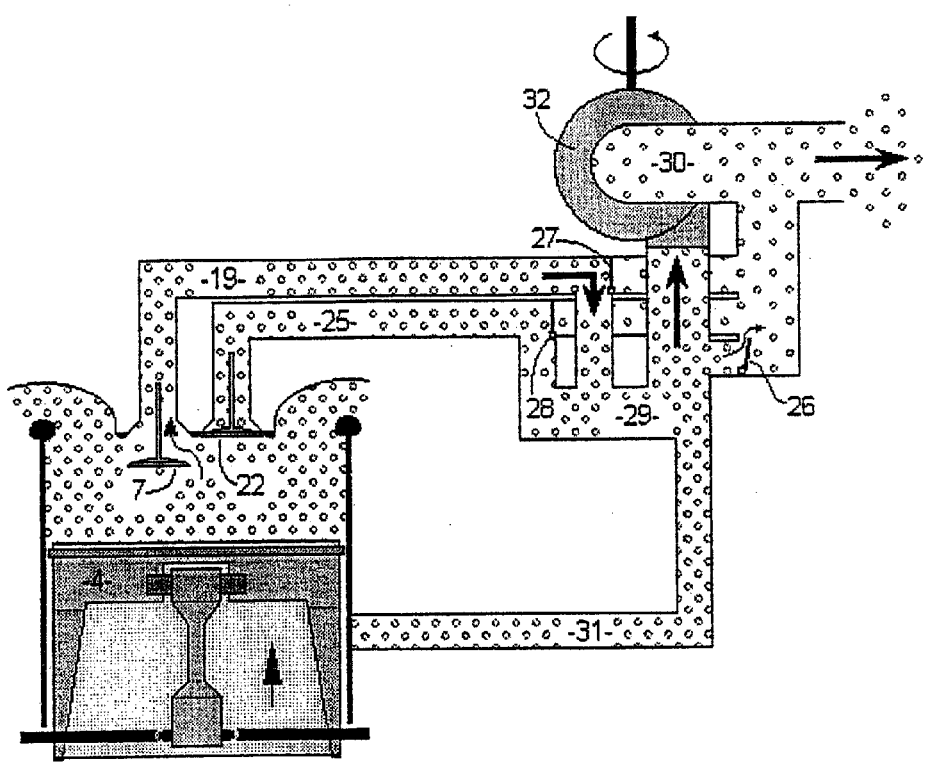
Figure 9:
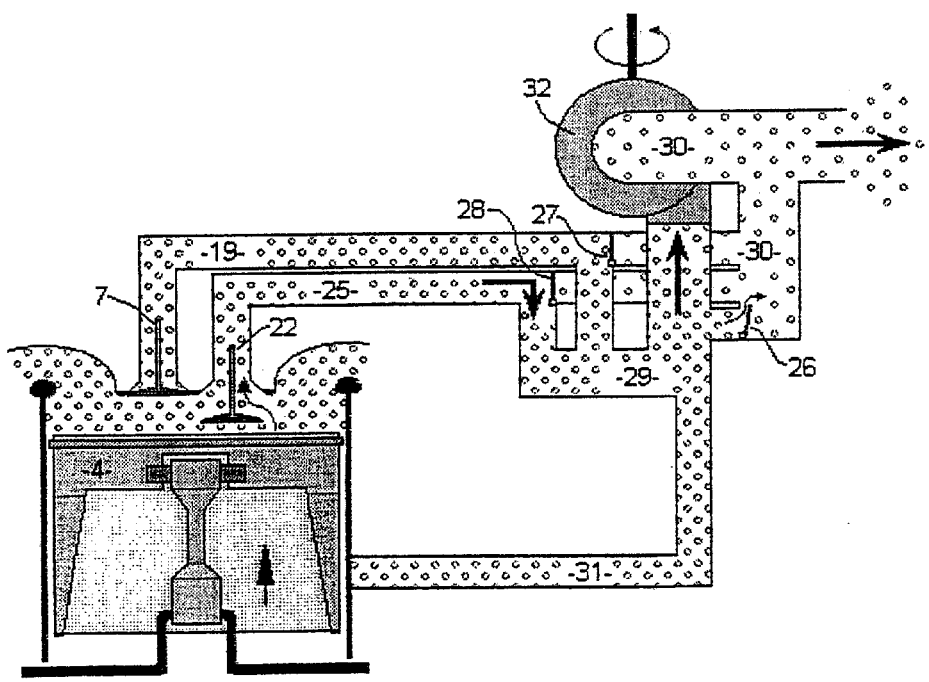

FIGS. 8a to 8c show the engine from FIG. 5, functioning at a partial load and being only partially supercharged and the piston of whose low-pressure cylinder occupies three positions during the exhaust stroke; and FIGS. 9a to 9c show the engine from FIG. 5, functioning at full load, being fully supercharged and showing the three positions of the piston of its low-pressure cylinder during the exhaust stroke.

Figure 1:
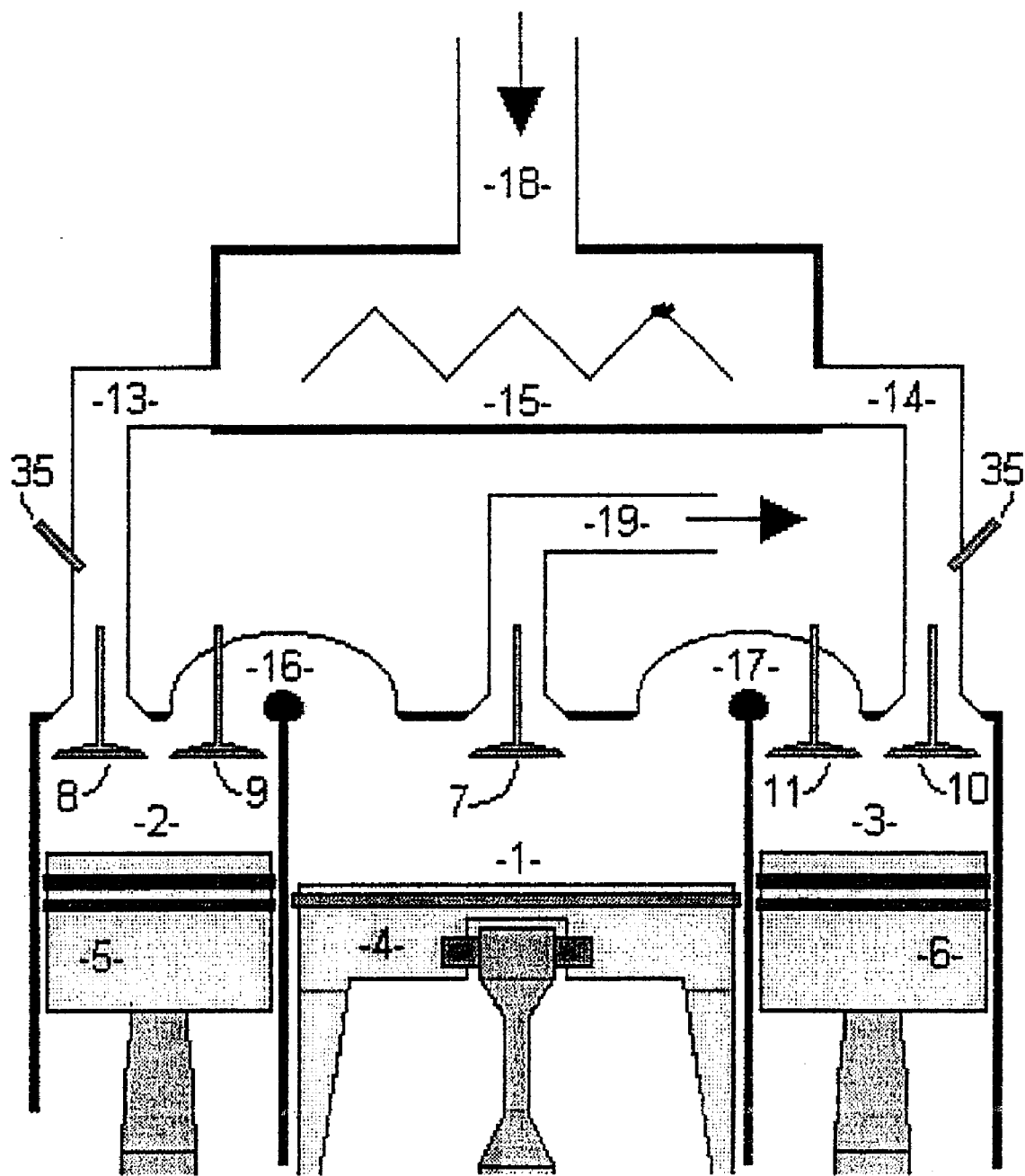

FIGS. 1 to 2 show a first embodiment of a 5-stroke internal combustion engine with controlled ignition according to the invention, which comprises three cylinders arranged in line; more precisely, the said engine comprises two high-pressure combustion cylinders (2, 3) located at the ends of the crankshaft (not shown) of the engine and functioning according to the cycle of a four-stroke engine and a central low-pressure cylinder (1) which functions in two-stroke mode. The volume of the low-pressure cylinder (1) is higher than that of the combustion cylinders (2,3). A heat exchanger (15) is connected, by a manifold (18), to the outlet of a compressor apparatus (not shown), which discharges pre-compressed air and the outlet of the heat exchanger is connected to two high-pressure combustion cylinders (2,3) by pre-compressed air-fuel mixture intake manifold (13,14). The manifolds (13,14) are fitted with intake valves (8,10) associated with the combustion cylinders (2,3). The introduction of fuel is carried out at the intake manifolds (13,14), through of a controlled injection device (35). The work chambers (C2, C3) of combustion cylinders (2,3) are connected to the work chamber (C1) of the low-pressure cylinder respectively by decanting manifolds (16, 17) of the gases of combustion. The decanting manifolds (16,17) are respectively fitted with decanting valves (9,11) air intake valves or air-fuel mixture valves (8, 10), as well as sparking plugs (not shown) located in the heads (2a, 3a) of the high-pressure combustion cylinders (2, 3)

The work chamber (C1) of the low-pressure cylinder (1) is closed by a cylinder head (1a), which comprises a closure valve (7) of an exhaust manifold (19) connected to the cylinder head and communicating with the work chamber (C1).

In this configuration of three cylinders (1 to 3), the low-pressure cylinder (1) forms, together with the left hand high-pressure combustion cylinder (2), a first pair of detonation cylinders, whilst it forms, with the right hand high-pressure combustion cylinder (3), a second pair of detonation cylinders, as can be gathered from the description below of the functioning of the engine, referring to FIGS. 2a to 2d.

These Figures show in detail the four phases of functioning of the engine, which are met during the revolutions of the crankshaft of the engine from FIG. 1. In FIGS. 2a to 2d, the zones filled with simple lines are air-filled zones, the zones filled with crosses are zones filled with air-fuel mixture and zones filled with small circles are zones filled with gases of combustion.

Figure 2A:
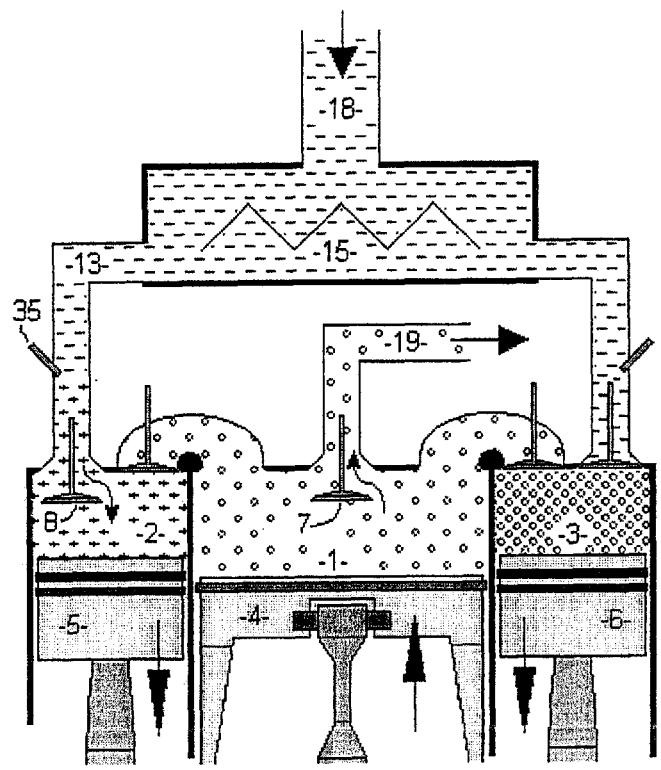
FIGS. 2a to 2d show the section identical with that of FIG. 1 and represent four phases of the functioning of the engine, which occur during two revolutions of the crankshaft of the said engine.

As shown in FIG. 2a, the pistons (5,6) of the high-pressure combustion cylinders (2,3) are in the process of descending in the cylinders (2,3), whilst the low-pressure piston (4) rises in the cylinder (1) The left hand combustion cylinder (2) is in the process of intake of a pre-compressed air-fuel mixture via the intake valve (8) which is open for this purpose. The low-pressure cylinder (1) is in the process of delivering the gases of combustion via the exhaust valve (7), which is open, to the exhaust manifold (19). The right hand combustion cylinder (3) is in the process of expanding the gases of combustion for the first time.

Figure 2B:
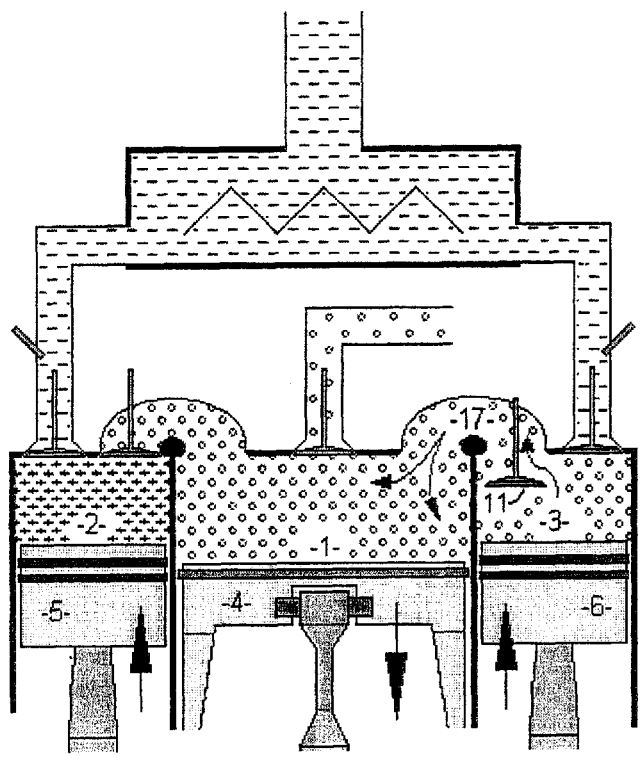

In FIG. 2b, the pistons (5,6) of the high-pressure combustion cylinders (2,3) are in the process of rising in cylinders (2,3), whilst the low-pressure piston (4) descends in the cylinder (1). The left hand combustion cylinder (2) is in the process of compressing the air-fuel mixture, which it will intake and towards the end of the said compression cycle, the air-fuel mixture will be ignited by a spark from a sparking plug. All the valves (8,9) associated with the cylinder (2) are closed. The low-pressure cylinder (1) is in the process of intake of the gases of combustion from the combustion cylinder (3), which delivers the said gases via the decanting manifold (17), the associated decanting valve (11) being open. Due to the fact that the volume of the low-pressure cylinder (1) is greater than the volume of the combustion cylinder (3), the decanting of the gases of combustion from combustion cylinder (3) into the low-pressure cylinder (1) is accompanied by an expansion of the said gases of combustion, producing work which can be used on the crankshaft.

Figure 2C:
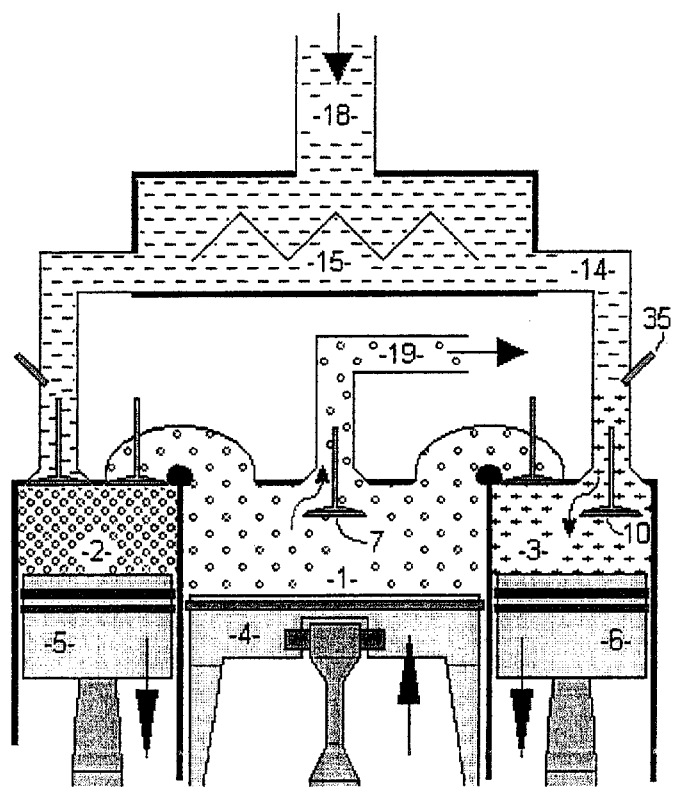

According to FIG. 2c, the pistons (5,6) of the high-pressure combustion cylinders (2,3) are in the process of again descending in the cylinders (2,3), whilst the low-pressure piston (4) again rises in cylinder (1). The combustion cylinder (3) is in the process of intake of a pre-compressed air-fuel mixture via the intake valve (10), which is open for that purpose. The low-pressure cylinder (1) is in the process of delivering the gases of combustion via the exhaust valve (7) which is open, to the manifold (19). The left hand combustion cylinder (2) is in the process of expanding the gases of combustion for the first time.

Figure 2D:
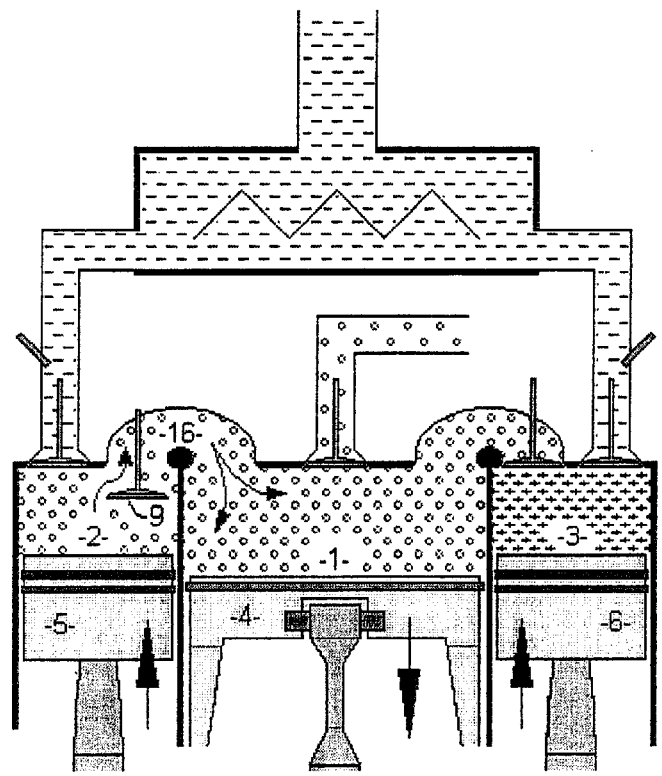

In FIG. 2d, the pistons (5,6) of the combustion cylinders (2,3) are in the process of rising in the said cylinders, whilst the low-pressure piston (4) descends in the cylinder (1). The right hand combustion cylinder (3) is in the process of compressing the air-fuel mixture which has been subject to intake and towards the end of this compression cycle, the said air-fuel mixture is ignited by the spark from the sparking plug, all the valves (10,11) associated with this cylinder being closed. The low-pressure cylinder (1) is in the process of intake of the gases of combustion from the combustion cylinder (2), which delivers the said gases via the decanting manifold (16) the associated decanting valve (9) being open. Owing to the fact that the volume of the low-pressure cylinder (1) is greater than the volume of the combustion cylinder (2), the decanting of the gases of combustion from the combustion cylinder (2) to the low-pressure cylinder (1) is accompanied by an expansion of the said gases of combustion, producing work which can be used on the crankshaft.

According to a variant of the embodiment, the five-stroke internal combustion engine with three cylinders differs from that described earlier as to the manner of introducing the fuel which is injected, towards the end of the compression cycle, directly into the combustion chambers of the high-pressure combustion cylinders (2,3), where it will ignite spontaneous. The power of the heat exchanger (15), as well as the ratios of the cylinders and of compression must, of course, be readjusted.

Figure 3A:
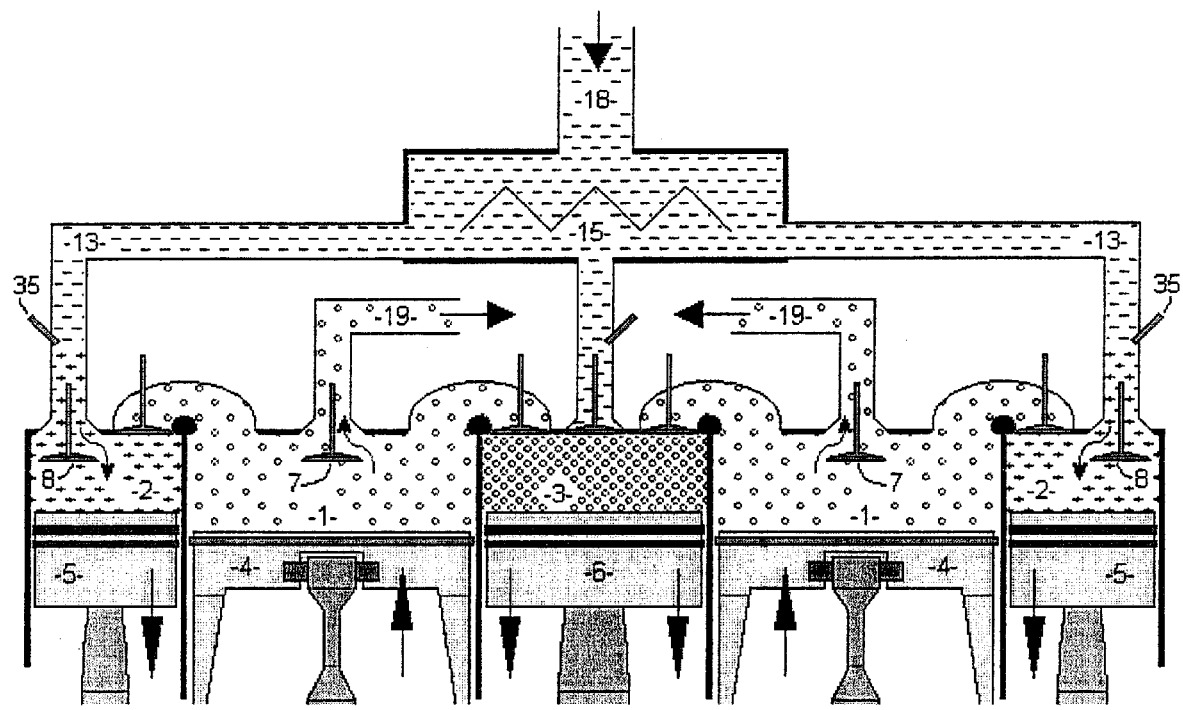
FIGS. 3a to 3d show the vertical section of the engine block of a second embodiment of the engine with five cylinders and relate to the functioning thereof during two revolutions of the crankshaft of the said engine.
Figure 3B:
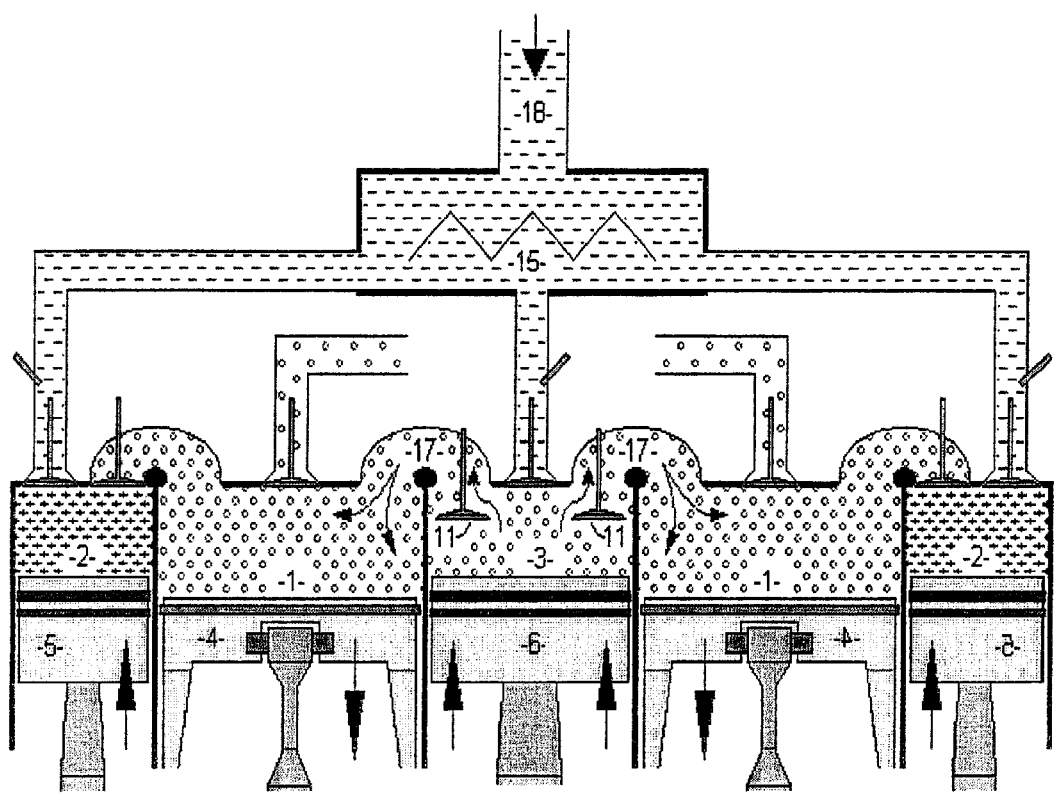
Figure 3C:
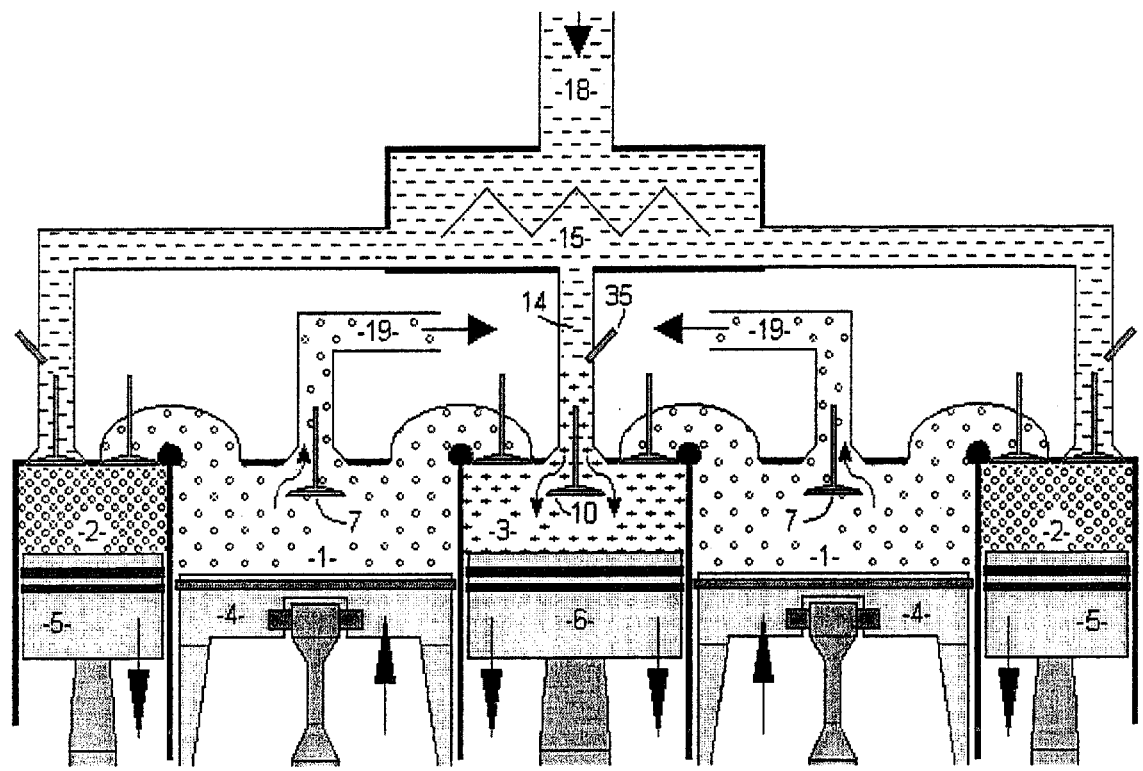
Figure 3D:
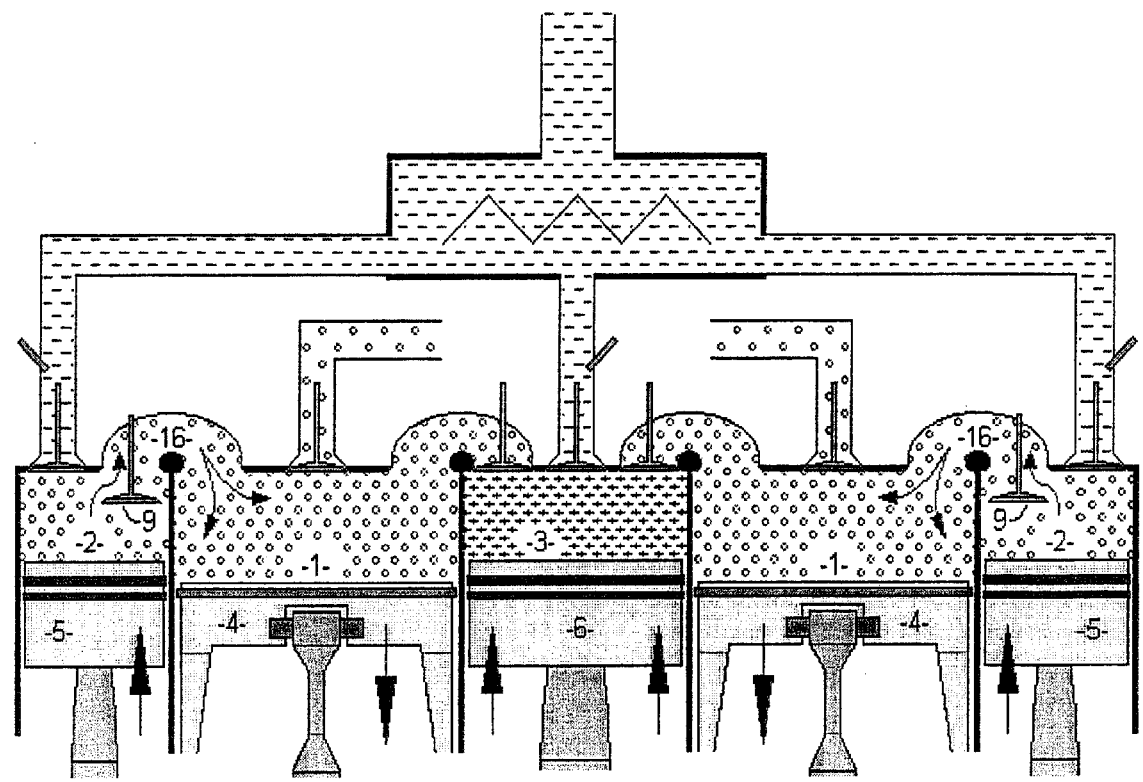

It is possible by referring to FIGS. 3a to 3d, to deduce from the embodiment of the internal combustion engine with three cylinders, that of the engine with five cylinders, by juxtaposing two engines, each with three cylinders, by arranging them in line, so that the two central high-pressure combustion cylinders work perfectly in phase. It is then possible to "fuse" the two latter ones into a single high-pressure central combustion cylinder (3), which will then preferably have a piston swept volume twice as high as the cylinder swept volume of the two high-pressure combustion cylinders (2) located at the ends of the crankshaft. The work chamber (C3) of the central high-pressure combustion cylinder (3) will thus communicate with the two work chambers (C1) of the low-pressure two-stroke cylinders, which are next to (1), by means of the valves (11) located in the head (3a) of cylinder (3) and the decanting manifolds (17). The second expansion,cycle of the gases of combustion in the central combustion cylinder (3) takes place by means of transferring them simultaneously to the two adjacent low-pressure cylinders (1) via the open valves (11) and the manifolds (17), as shown in FIG. 3b.

FIGS. 3a to 3d show in detail the four phases which are met during the two revolutions of the crankshaft of the five-stroke internal combustion engine with five cylinders, where the zones filled with horizontal lines are filled with air only and the zones filled with small circles are filed with the gases of combustion. It is unnecessary to describe these four phases, which can be seen clearly from the description of the five-stroke engine with three cylinders, previously described in detail by reference to FIGS. 2a to 2d.

Figure 4:
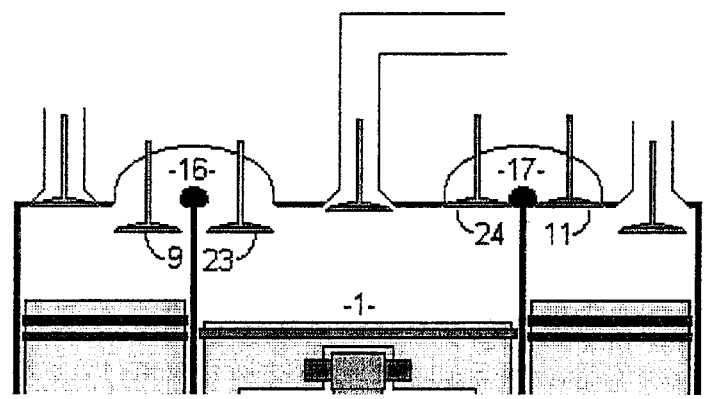
FIG. 4 is a vertical section view of a low-pressure cylinder head where two supplementary decanting valves are provided to close the decanting channels at this cylinder.

This manner of proceeding is, of course, not limited to five cylinders and it is also possible to construct five-stroke internal combustion engines with 5, 7, 9 . . . cylinders. All these embodiments lend themselves to two types of ignition, spontaneous and controlled Another embodiment of the five-stroke internal combustion engine with five and with three cylinders is shown in FIG. 4, where the decanting manifolds (16,17) can be closed not only from combustion cylinders (2,3) by the valves (9,11), but also from the low-pressure cylinder (1) respectively by means of auxiliary decanting valves (23,24). The decanting valves (9,23) respectively fitted in the cylinder heads (2a, 1a) and at the ends of the decanting manifold (16) which connects the work chamber (C2) of the left hand combustion cylinder (2) to the work chamber (C1) of the low-pressure cylinder (1), open and close approximately synchronously. Similarly, the decanting valves (11,24) fitted respectively in the cylinder heads (3a, 1a) and at the ends of the decanting manifold (17), linking the work chamber (C3) of the right hand combustion cylinder (3) with the work chamber (C1) of the low-pressure cylinder (1), open and close approximately synchronously. The interest of using the auxiliary decanting valves (23, 24) is, on the one hand to reduce the dead space of the low-pressure cylinder (1) by separating the volume of the inactive manifolds (16,17) during the second expansion cycle of the gases of combustion from the volume of the work chamber (C1) of the low-pressure cylinder (1). On the other hand, this auxiliary decanting valve (23,24) prevents the closed principal decanting valve (9,11) from undergoing downstream the relatively high pressure, which prevails in the low-pressure cylinder (1) at the start of the second expansion cycle, a pressure which could tend to open the principal decanting valve (9,11) associated with the combustion cylinder (2, 3).

As previously stated, the five-stroke internal combustion engine is destined for a more or less high supercharge. This supercharge can obviously be given in various ways. Supercharge by means of a turbo-compressor essentially consists in a turbine driven by the expansion of the gases of combustion from the internal combustion engine, which compresses the air taken into the engine cylinders.

FIG. 5 shows a somewhat more sophisticated embodiment of supercharging by means of a turbo-compressor. In fact, according to this embodiment, the gases of combustion, expanded a second time in the low-pressure cylinder (1), are directed via three different channels or exhaust manifolds (19,25,31), to the collector of exhaust gases (29) located at the inlet of a turbine (32). The three exhaust manifolds (19,25,31) can be closed from the low-pressure cylinder, respectively by exhaust valves (7,22) located in the cylinder head (1a) to which are connected the two manifolds (19,25) of the low-pressure cylinder (1) and the exhaust ports (21) accommodated in the jacket of the low-pressure cylinder (1). The exhaust ports (21) will not be uncovered by the low-pressure piston (4), unless the latter is close to its low dead centre. The manifold (31) leads directly into the inlet (29) of the collector of exhaust gases. The two exhaust valves (7,22) are controlled in such a way, as not to open and close synchronously. The flow of the gases of combustion in the exhaust manifolds (19,25) connected to the head of the low-pressure cylinder (1), are either directed to the collector of exhaust gases (29) connected to the inlet of the turbine (32), or to the collector of exhaust gases (30), connected to the outlet of the turbine where the level of pressure approaches that of the ambient pressure. For this purpose, the exhaust gas deviation flaps (27,28) are arranged in the exhaust manifold (19,25) opposite their ends connected to the low-pressure cylinder (1) head and can occupy a closed position transverse to the manifolds (19,25), in order to close them and to direct the gases of combustion to the inlet of the turbine (32) via drilled holes (19a, 25a), opened by flaps (27, 28) and made in the walls of the manifolds (19,25) in communication with the collector (29) which communicates with the inlet of the turbine (32) or a position of opening of the manifolds (19,25) and of closure of the drilled holes (19a, 25a), in order to guide the gases of combustion directly into the collector of exhaust gases from outlet (30), into which lead the manifolds (19,25). A valve of the waste gate type (26) is arranged between the collector of exhaust gases from inlet (29) and the collector of exhaust gases from outlet (30) of the turbine (32), in order to maintain the adjustment of the pressure at the inlet of the turbine, according to the load.

The object of this exhaust system to the inlet of the turbine is that of reducing as far as possible the delivery pressure inside the low-pressure cylinder (1) during the forward stroke of the piston (4) thereof.

FIG. 5 also shows a deviation flap (36) on the intake side, normally closed, which, when open, makes possible the free flow of air from the pre-compressed air intake manifold (18) to the auxiliary air intake connection piece (34), which leads to the surrounding air. The interest of the auxiliary air intake connection piece (34) and of the associated deviation flap (36) is, on the one hand, the intake of air, avoiding the compressor (12) at a very low engine load and on the other hand, to act as a valve and a backup manifold, in a case where the adjustment of the delivery pressure of the compressor (12) can no longer be carried out, following, for example, technical failures, by means of the valve (26) located at the inlet of the turbine (32) with the aim of adjusting the power of the latter. This auxiliary intake manifold (34) is, moreover, equipped with a throttle valve (33), to reduce further the intake pressure in the case of very low loads and of slow running of the engine.

The functioning of this embodiment of the supercharged engine will be explained in detail by now referring to FIGS. 6 to 9.

FIGS. 6a to 6c show the method of evacuation of the gases of combustion in cases where the load will be so low that a supercharge will not be needed. The valve (26) is completely open and is controlled in such a way as to maintain a minimum pressure at the inlet of the turbine (32), to provide a suitable gathering of speed. The two deviation flaps (27,28) are open so as to guide the exhaust gases from the exhaust manifolds (19,25) directly, without passing through the turbine (32), to the exhaust collector (30) at the turbine outlet.

In FIG. 6a, the low-pressure piston (4), having reached the second expansion cycle of the gases of combustion, arrives in its low dead centre position and the exhaust ports (21) which are present in the low-pressure cylinder (1) are uncovered and because of residual pressure in the low-pressure cylinder (1) which is higher than the pressure prevailing in the exhaust collector (29) at the inlet of the turbine (32), a part of the gases of combustion contained in the low-pressure cylinder (1), will flow via the exhaust ports (21) and along the exhaust manifold (31), to the collector of exhaust gases (29), where the pressure will hardly be above the ambient pressure following the opening of the valve (26). Consequently, the pressure inside the low-pressure cylinder (1) will fall, in order to reach almost the level of the ambient pressure. In this position of the low-pressure piston (4), the two exhaust valves (7,22) are still closed.

In FIG. 6b, the low-pressure piston (4) is in a position such that the exhaust ports (21) will again be closed by the former, a first exhaust valve (7) opens and the piston (4) of the low-pressure cylinder (1), advancing or rising further in the cylinder, will drive another part of the gases of combustion through the open exhaust valve (7) and along the directly associated exhaust manifold (19), without passing through the turbine (32), to the collector of exhaust gases (30) located at the outlet of the turbine, the deviation flap (27) being in the open position.

In FIG. 6c, the low-pressure piston (4) is advanced further in the cylinder and the first exhaust valve (7) closes. The second exhaust valve (22) is now open and the piston (4) of the low-pressure cylinder (1), advancing further, will drive the last part of the gases of combustion through the open exhaust valve (22) along the associated exhaust manifold (25) without passing through the turbine (32), directly to the collector of exhaust gases (30), the deviation flap (28) being in the open position.

FIGS. 7a to 7c show the method of evacuation of the gases of combustion in cases where a slight supercharging of the engine will at all events already be required. The valve (26) is no longer completely open and is controlled in such a way as to maintain a pressure at the inlet of the turbine (32) according to the low load requested. The two deviation flaps (27,28) are in the open position to guide the exhaust gases from the exhaust manifolds (19,25), without passing through the turbine (32), directly to the collector of exhaust gases (30) at the outlet of the turbine. Only the quantity of gas evacuated by the exhaust ports (21) located at the bottom of the low-pressure cylinder (1) is directed to the turbine (32), there to be expanded. The gases of combustion evacuated by the exhaust valves (7,22) located in the head (1a) of the low-pressure cylinder (1) do not pass through the turbine (32, and the pressure in the low-pressure cylinder will fall to a level close to that of ambient pressure, when one of the two exhaust valves (7,22) opens.

FIGS. 8a to 8c show the method of evacuation of the gases of combustion, in cases where the load is a medium one and where greater supercharging of the engine becomes necessary. The valve (26) is controlled in such a way as to maintain a pressure at the inlet of the turbine (32) according to the load requested. The deviation flap (27) associated with the exhaust manifold (19), in turn associated with the exhaust valve (7) which will open when the low-pressure piston (4) has closed the exhaust ports (21), is in a closed position such as to direct the exhaust gases, flowing along the corresponding exhaust manifold (19) to the inlet of the turbine (32), there to be expanded. The other deviation flap (28) associated with the exhaust manifold (25), in turn associated with the exhaust valve (22) which will open later when the other exhaust valve (7) closes, is in an open position, such as to guide the exhaust gases from the corresponding exhaust manifold (25) directly, without passing through the turbine (32), to the collector of exhaust gases (30) at the outlet of the turbine (32). This time, the quantity of gas evacuated by the exhaust ports (21) located at the bottom of the low-pressure cylinder (1) and the quantity of gas evacuated by the exhaust valve (7) which opens first, will be directed to the turbine (32) there to be expanded. The gases of combustion evacuated by the other exhaust valve (22) opening last, will not pass through the turbine (32) and the pressure in the low-pressure cylinder (1) will fall to a level close to that of ambient pressure, when the exhaust valve (22) opens.

FIGS. 9a to 9c show the method of evacuation of the gases of combustion in a case where the load is high and where a maximum supercharge of the engine becomes necessary. The valve (26) will be controlled in such a way as to maintain a pressure at the inlet of the turbine (32) according to the load requested. The two deviation flaps (27,28) associated with the exhaust manifolds (19,25) which are in turn associated with the exhaust valves (7,22) are in a closed position, in turn, to direct the exhaust gases flowing along the corresponding exhaust manifolds (19,25) to the inlet of the turbine (32), there to be expanded. This time, all the gases evacuated from the low-pressure cylinder (1) except those which will pass through the valve 26 which may be open, are directed to the turbine (32) to be expanded. It is only in that situation that the pressure in the low-pressure cylinder (1) will be close to the counter-pressure created by the turbine throughout exhaust stroke.

This method of evacuation of the gases of combustion to the turbine of the turbo-compressor unit can obviously be made less complex by eliminating the exhaust ports (21) and bringing forward the opening of the first exhaust valve (7). The deviation flap (27), which is associated with the corresponding exhaust manifold (19), will be closed throughout and will accordingly be able to be eliminated. Similarly, it is possible to eliminate the second exhaust valve (22) as well as the exhaust manifold (25) and the corresponding deviation flap (28) and in this case it is necessary to wait for the opening of the first exhaust valve (7).

The five-stroke internal combustion engine, which is the subject of the present invention can be used in all technical fields where currently such equipment is being used, particularly in road transport.

The principal advantage of the invention, compared with existing engines, is an appreciable increase in energy output, As far as the power of heat exchangers and maximum pressures which appear entirely permissible are concerned, the calculations show an increase in this output of about 20%, at full load to 25%, at partial load, in the case of a controlled ignition engine (gasoline) and 14 to 25% in the case of a spontaneous ignition engine (Diesel)

The other advantage of the invention, compared with existing engines, is an improved power density which is due to the faculty of imparting a high supercharge which is able to reach an absolute pressure at the intake of combustion cylinders of 3 to 5 bars.

What is claimed is:

1. An internal combustion engine of a type comprising at least one cylinder (2, 3) which includes a work chamber (C2, C3) with a volume which can be varied by the travel in the cylinder (2,3) of a piston (5,6) between a high dead center position and a low dead center position, under the action of pressure forces periodically generated in the said chamber, there being associated with each cylinder (2,3) a means of intake and evacuation of a gaseous fluid, the piston of each cylinder being connected to a crankshaft of the engine, using at least, on the one hand, a cylinder (1) functioning as a low-pressure cylinder in a two stroke mode which comprises the intake accompanied by the expansion producing useful work in every stroke of the piston of the low-pressure cylinder (1) to its low dead center and the exhaust during every stroke to its high dead center of a gaseous fluid and on the other hand, two cylinders (2,3) functioning as combustion cylinders in a four-stroke mode, which comprise the intake of air or of an air-fuel mixture during the first stroke of the piston of each of the combustion cylinders (2,3) to its low dead center, the compression of this air or of this air-fuel mixture in the combustion cylinder during the first stroke of the piston to its high dead center, followed by the combustion, the expansion of the gases of combustion during the second stroke of the piston to its low dead center producing useful work and the delivery of the combustion gases during the second stroke of the piston to its high dead center, the piston swept volume of each of the combustion cylinders (2,3) being smaller than that of the low-pressure cylinder (1), the combustion cylinders (2,3) alternatively delivering their gases of combustion to the low-pressure pressure cylinder (11) for the purpose of a second expansion cycle of the combustion gases and their exhaust from the engine and comprising a means of excess feeding the combustion cylinder (2,3) wherein the volume compression ratio of the combustion cylinders is relatively low, so as to be able to be highly supercharged;

wherein it comprises five cylinders arranged in line including three high-pressure combustion cylinders (2,3) and two low pressure cylinders (1), two combustion cylinders (2) being located at the ends of the crankshaft to which are connected the two pistons (5) of these cylinders, the third high-pressure combustion cylinder (3) being located in the center and able to communicate with the two adjacent low-pressure cylinders (1) by respectively, at least one valve (11) and one decanting manifold (17), allowing simultaneous transfer during the second expansion cycle, the gases of combustion contained in the central combustion cylinder (3) in the two low-pressure cylinders (1), which are associated therewith and by the fact that the said low-pressure cylinders (1) receive, during the next rotation of the crankshaft following the travel of the piston to its low dead center, all the gases of combustion contained in the combustion cylinder (2) located at the end of the crankshaft and next to the low-pressure cylinder (1) in question; and wherein when the aforementioned turbo-compressor unit performs the pre-compression of the air or the air-fuel mixture at the intake of the combustion cylinders (2,3) up to three different manifolds (19,25,31) fed in a non-simultaneous manner, deliver, during the stroke of the piston (4) of the low-pressure cylinder(1) towards it high dead center, in the direction of the inlet of the turbine (29), the combustion gases contained in the low-pressure cylinder (1), all the manifolds except the last one (19,25) manifolds, each comprising a deviation flap (27,28) of, combustion gases controlled individually according to the load of the engine and which, in an open position, guide the gases of combustion from the low-pressure cylinder (1) directly to the exhaust, whilst when in the closed position, the deviation flap (27 28) guides the said gases of combustion to the collector of combustion gases (29) at the inlet of the turbine (32), the last exhaust manifold (31) being the first in communication with the work chamber (C1) of the low-pressure cylinder (1).

2. An internal combustion engine according to claim 1, wherein it comprises an odd number, greater than five, of cylinders arranged in line in such a way that at the ends of its crankshaft are located two high-pressure combustion cylinders (2) between two low-pressure cylinders (1) and able to communicate with the two adjacent low-pressure cylinders (1), respectively by means of at least one valve and one decanting manifold, so as to transfer simultaneously during the second expansion cycle, the combustion gases contained in the combustion cylinder (3), to the two low-pressure cylinders (1) which are associated therewith.

3. An internal combustion engine according to claim 1, wherein it comprises a means of control of the supercharge pressure of air or the air-fuel mixture at the intake of the combustion cylinders (2,3) to effect the adjustment of the engine load for a given speed, largely of the range of the functioning torque thereof, and a compressor driven mechanically or a turbo-compressor unit, whose turbine is driven by a supplementary expansion cycle of the exhaust gases of the engine, in order to effect the pre-compression of the air or the air-fuel mixture, if necessary cooled by means of a heat exchanger (15), the inlet of the turbine (32) being connected to a collector of combustion gases (29), fitted with a valve of the waste gate type (26) which can, in an open or partially open position, divert all or a part of the combustion gases directly to the engine exhaust.

4. An internal combustion engine according to claim 1, wherein the work chambers (C2,C3) of the combustion cylinders (2,3) comprise a means of direct injection of fuel into the compressed air during the compression stroke, in respect of the variable ratios of the weight of air divided by the weight of fuel and controlled according to the load of the engine, the work chambers (C2,C3) of the high-pressure combustion cylinders (2,3) being fitted with a means to make possible the ignition of the air-fuel mixture.

5. An internal combustion engine according to claim 1, wherein it comprises the exhaust ports (21) arranged in the low-pressure cylinder (1) to carry out, wholly or partially, the exhaust of the gases of combustion contained in the cylinder (1), the exhaust ports being uncovered by piston (4)

of the low-pressure cylinder (1) when the latter is close to its low dead center.

6. An internal combustion engine according to claim 1, wherein each of the decanting manifolds (16,17) comprises an auxiliary supplementary decanting valve (23,24) associated with the head (1a) of the low-pressure cylinder (1) and opening approximately synchronously with the principal decanting valve (9,11) of the same decanting manifold associated with the head (2a, 3a) of the combustion cylinder (2,3).

7. An internal combustion engine of a type comprising at least one cylinder (2, 3) which includes a work chamber (C2, C3) with a volume which can be varied by the travel in the cylinder (2,3) of a piston (5,6) between a high dead center position and a low dead center position, under the action of pressure forces periodically generated in the said chamber, there being associated with each cylinder (2,3) a means of intake and evacuation of a gaseous fluid, the piston of each cylinder being connected to a crankshaft of the engine, using at least, on the one hand, a cylinder (1) functioning as a low-pressure cylinder in a two stroke mode which comprises the intake accompanied by the expansion producing useful work in every stroke of the piston of the low-pressure cylinder (1) to its low dead center and the exhaust during every stroke to its high dead center of a gaseous fluid and on the other hand, two cylinders (2,3) functioning as combustion cylinders in a four-stroke mode, which comprise the intake of air or of an air-fuel mixture during the first stroke of the piston of each of the combustion cylinders (2,3) to its low dead center, the compression of this air or of this air-fuel mixture in the combustion cylinder during the first stroke of the piston to its high dead center, followed by the combustion, the expansion of the gases of combustion during the second stroke of the piston to its low dead center producing useful work and the delivery of the combustion gases during the second stroke of the piston to its high dead center, the piston swept volume of each of the combustion cylinders (2,3) being smaller than that of the low-pressure cylinder (1), the combustion cylinders (2,3) alternatively delivering their gases of combustion to the low-pressure cylinder (11) for the purpose of a second expansion cycle of the combustion gases and their exhaust from the engine and comprising a means of excess feeding the combustion cylinder (2,3) wherein the volume compression ratio of the combustion cylinders is relatively low, so as to be able to be highly supercharged;

wherein it comprises a means of control of the supercharge pressure of air or the air-fuel mixture at the intake of the combustion cylinders (2,3) to effect the adjustment of the engine load for a given speed, largely of the range of the functioning torque thereof, and a compressor driven mechanically or a turbo-compressor unit, whose turbine is driven by a supplementary expansion cycle of the exhaust gases of the engine, in order to effect the pre-compression of the air or the air-fuel mixture, if necessary cooled by means of a heat exchanger (15), the inlet of the turbine (32) being connected to a collector of combustion gases (29), fitted with a valve of the waste gate type (26) which can, in an open or partially open position, divert all or a part of the combustion gases directly to the engine exhaust;

wherein the work chambers (C2,C3) of the combustion cylinders (2,3) comprise a means of direct injection of fuel into the compressed air during the compression stroke, in respect of the variable ratios of the weight of air divided by the weight of fuel and controlled according to the load of the engine, the work chambers (C2,C3) of the high-pressure combustion cylinders (2,3) being fitted with a means to make possible the ignition of the air-fuel mixture;

wherein it comprises the exhaust ports (21) arranged in the low-pressure cylinder (1) to carry out, wholly or partially, the exhaust of the gases of combustion contained in the cylinder (1), the exhaust ports being uncovered by piston (4) of the low-pressure cylinder (1) when the latter is close to its low dead center; and wherein when the aforementioned turbo-compressor unit performs the pre-compression of the air or the air-fuel mixture at the intake of the combustion cylinders (2,3) up to three different manifolds (19,25,31) fed in a non-simultaneous manner, deliver, during the stroke of the piston (4) of the low-pressure cylinder (1) towards it high dead center, in the direction of the inlet of the turbine (29), the combustion gases contained in the low-pressure cylinder (1), all the manifolds except the last one (19,25) manifolds, each comprising a deviation flap (27,28) of, combustion gases controlled individually according to the load of the engine and which, in an open position, guide the gases of combustion from the low-pressure cylinder (1) directly to the exhaust, whilst when in the closed position, the deviation flap (27 28) guides the said gases of combustion to the collector of combustion gases (29) at the inlet of the turbine (32), the last exhaust manifold (31) being the first in communication with the work chamber (C1) of the low-pressure cylinder (1).

8. An internal combustion engine of a type comprising at least one cylinder (2,3) which includes a work chamber (C2, C3) with a volume which can be varied by the travel in the cylinder (2,3) of a piston (5,6) between a high dead center position and a low dead center position, under the action of pressure forces periodically generated in the said chamber, there being associated with each cylinder (2,3) a means of intake and evacuation of a gaseous fluid, the piston of each cylinder being connected to a crankshaft of the engine, using at least, on the one hand, a cylinder (1) functioning as a low-pressure cylinder in a two stroke mode which comprises the intake accompanied by the expansion producing useful work in every stroke of the piston of the low-pressure cylinder (1) to its low dead center and the exhaust during every stroke to its high dead center of a gaseous fluid and on the other hand, two cylinders (2,3) functioning as combustion cylinders in a four-stroke mode, which comprise the intake of air or of an air-fuel mixture during the first stroke of the piston of each of the combustion cylinders (2,3) to its low dead center, the compression of this air or of this air-fuel mixture in the combustion cylinder during the first stroke of the piston to its high dead center, followed by the combustion, the expansion of the gases of combustion during the second stroke of the piston to its low dead center producing useful work and the delivery of the combustion gases during the second stroke of the piston to its high dead center, the piston swept volume of each of the combustion cylinders (2,3) being smaller than that of the low-pressure cylinder (1), the combustion cylinders (2,3) alternatively delivering their gases of combustion to the low-pressure cylinder (11) for the purpose of a second expansion cycle of the combustion gases and their exhaust from the engine and comprising a means of excess feeding the combustion cylinder (2,3) wherein the volume compression ratio of the combustion cylinders is relatively low, so as to be able to be highly supercharged;

wherein it comprises five cylinders arranged in line including three high-pressure combustion cylinders (2,3) and two low pressure cylinders (1), two combustion cylinders (2) being located at the ends of the crankshaft to which are connected the two pistons (5) of these cylinders, the third high-pressure combustion cylinder (3) being located in the center and able to communicate with the two adjacent low-pressure cylinders (1) by respectively, at least one valve (11) and one decanting manifold (17), allowing simultaneous transfer during the second expansion cycle, the gases of combustion contained in the central combustion cylinder (3) in the two low-pressure cylinders (1), which are associated therewith and by the fact that the said low-pressure cylinders (1) receive, during the next rotation of the crankshaft following the travel of the piston to its low dead center, all the gases of combustion contained in the combustion cylinder (2) located at the end of the crankshaft and next to the low-pressure cylinder (1) in question;

wherein it comprises a means of control of the supercharge pressure of air or the air-fuel mixture at the intake of the combustion cylinders (2,3) to effect the adjustment of the engine load for a given speed, largely of the range of the functioning torque thereof, and a compressor driven mechanically or a turbo-compressor unit, whose turbine is driven by a supplementary expansion cycle of the exhaust gases of the engine, in order to effect the pre-compression of the air or the air-fuel mixture, if necessary cooled by means of a heat exchanger (15), the inlet of the turbine (32) being connected to a collector of combustion gases (29), fitted with a valve of the waste gate type (26) which can, in an open or partially open position, divert all or a part of the combustion gases directly to the engine exhaust;

wherein the work chambers (C2,C3) of the combustion cylinders (2,3) comprise a means of direct injection of fuel into the compressed air during the compression stroke, in respect of the variable ratios of the weight of air divided by the weight of fuel and controlled according to the load of the engine, the work chambers (C2,C3) of the high-pressure combustion cylinders (2,3) being fitted with a means to make possible the ignition of the air-fuel mixture;

wherein it comprises the exhaust ports (21) arranged in the low-pressure cylinder (1) to carry out, wholly or partially, the exhaust of the gases of combustion contained in the cylinder (1), the exhaust ports being uncovered by piston (4) of the low-pressure cylinder (1) when the latter is close to its low dead center; and wherein when the aforementioned turbo-compressor unit performs the pre-compression of the air or the air-fuel mixture at the intake of the combustion cylinders (2, 3) up to three different manifolds (19, 25, 31) fed in a non-simultaneous manner, deliver, during the stroke of the piston (4) of the low-pressure cylinder (1) towards it high dead center, in the direction of the inlet of the turbine (29), the combustion gases contained in the low-pressure cylinder (1), all the manifolds except the last one (19,25) manifolds, each comprising a deviation flap (27,28) of, combustion gases controlled individually according to the load of the engine and which, in an open position, guide the gases of combustion from the low-pressure cylinder (1) directly to the exhaust, whilst when in the closed position, the deviation flap (27, 28) guides the said gases of combustion to the collector of combustion gases (29) at the inlet of the turbine (32), the last exhaust manifold (31) being the first in communication with the work chamber (C1) of the low-pressure cylinder (1).

9. An internal combustion engine of a type comprising at least one cylinder (2,3) which includes a work chamber (C2, C3) with a volume which can be varied by the travel in the cylinder (2,3) of a piston (5,6) between a high dead center position and a low dead center position, under the action of pressure forces periodically generated in the said chamber, there being associated with each cylinder (2,3) a means of intake and evacuation of a gaseous fluid, the piston of each cylinder being connected to a crankshaft of the engine, using at least, on the one hand, a cylinder (1) functioning as a low-pressure cylinder in a two stroke mode which comprises the intake accompanied by the expansion producing useful work in every stroke of the piston of the low-pressure cylinder (1) to its low dead center and the exhaust during every stroke to its high dead center of a gaseous fluid and on the other hand, two cylinders (2,3) functioning as combustion cylinders in a four-stroke mode, which comprise the intake of air or of an air-fuel mixture during the first stroke of the piston of each of the combustion cylinders (2,3) to its low dead center, the compression of this air or of this air-fuel mixture in the combustion cylinder during the first stroke of the piston to its high dead center, followed by the combustion, the expansion of the gases of combustion during the second stroke of the piston to its low dead center producing useful work and the delivery of the combustion gases during the second stroke of the piston to its high dead center, the piston swept volume of each of the combustion cylinders (2,3) being smaller than that of the low-pressure cylinder (1), the combustion cylinders (2,3) alternatively delivering their gases of combustion to the low-pressure cylinder (11) for the purpose of a second expansion cycle of the combustion gases and their exhaust from the engine and comprising a means of excess feeding the combustion cylinder (2,3) wherein the volume compression ratio of the combustion cylinders is relatively low, so as to be able to be highly supercharged;

wherein it comprises an odd number, greater than five, of cylinders arranged in line in such a way that at the ends of its crankshaft are located two high-pressure combustion cylinders (2) between two low-pressure cylinders (1) and able to communicate with the two adjacent low-pressure cylinders (1), respectively by means of at least one valve and one decanting manifold, so as to transfer simultaneously during the second expansion cycle, the combustion gases contained in the combustion cylinder (3), to the two low-pressure cylinders (1) which are associated therewith;

wherein it comprises a means of control of the supercharge pressure of air or the air-fuel mixture at the intake of the combustion cylinders (2,3) to effect the adjustment of the engine load for a given speed, largely of the range of the functioning torque thereof, and a compressor driven mechanically or a turbo-compressor unit, whose turbine is driven by a supplementary expansion cycle of the exhaust gases of the engine, in order to effect the pre-compression of the air or the air-fuel mixture, if necessary cooled by means of a heat exchanger (15), the inlet of the turbine (32) being connected to a collector of combustion gases (29), fitted with a valve of the waste gate type (26) which can, in an open or partially open position, divert all or a part of the combustion gases directly to the engine exhaust;

wherein the work chambers (C2,C3) of the combustion cylinders (2,3) comprise a means of direct injection of fuel into the compressed air during the compression stroke, in respect of the variable ratios of the weight of air divided by the weight of fuel and controlled according to the load of the engine, the work chambers (C2,C3) of the high-pressure combustion cylinders (2,3) being fitted with a means to make possible the ignition of the air-fuel mixture;

wherein it comprises the exhaust ports (21) arranged in the low-pressure cylinder (1) to carry out, wholly or partially, the exhaust of the gases of combustion contained in the cylinder (1), the exhaust ports being uncovered by piston (4) of the low-pressure cylinder (1) when the latter is close to its low dead center; and wherein when the aforementioned turbo-compressor unit performs the pre-compression of the air or the air-fuel mixture at the intake of the combustion cylinders (2, 3) up to three different manifolds (19, 25, 31) fed in a non-simultaneous manner, deliver, during the stroke of the piston (4) of the low-pressure cylinder (1) towards it high dead center, in the direction of the inlet of the turbine (29), the combustion gases contained in the low-pressure cylinder (1), all the manifolds except the last one (19,25) manifolds, each comprising a deviation flap (27,28) of, combustion gases controlled individually according to the load of the engine and which, in an open position, guide the gases of combustion from the low-pressure cylinder (1) directly to the exhaust, whilst when in the closed position, the deviation flap (27, 28) guides the said gases of combustion to the collector of combustion gases (29) at the inlet of the turbine (32), the last exhaust manifold (31) being the first in communication with the work chamber (C1) of the low-pressure cylinder (1).

10. An internal combustion engine according to claim 8, wherein each of the decanting manifolds (16,17) comprises an auxiliary supplementary decanting valve (23,24) associated with the head (1*a*) of the low-pressure cylinder (1) and opening approximately synchronously with the principal decanting valve (9,11) of the same decanting manifold associated with the head (2*a*, 3*a*) of the combustion cylinder (2,3).

* * * * *